Patented Feb. 1, 1949

2,460,268

UNITED STATES PATENT OFFICE 2,460,268

REFRACTORY COMPOSITION AND METHOD OF PRODUCING SAME

Theodore Kauffman, Jr., and Louis J. Jacobs, Chicago, Ill., assignors to The S. Obermayer Co., Chicago, Ill., a corporation of Ohio No Drawing. Application November 14, 1945, Serial No. 628,662

3 Claims. (Cl. 106—67)

This invention relates to the manufacture and use of a new kind of refractory material which will be referred to hereafter as "refractory composition." In refractory construction there is a class of refractory materials known variously as plastic refractory, plastic firebrick, or refractory ramming mixes, which we will hereinafter refer to as plastic refractory. Plastic refractory is frequently used for the monolithic lining of doors, roofs, arches, and walls of high temperature furnaces and for other specialized application. The ingredients of plastic refractory consist principally of grog (non-plastic refractory material in particle sizes varying over a wide range) and a material that is plastic or capable of being made plastic by the addition of a liquid (typical examples of the plastic ingredients are plastic fireclay and plastic kaolin). A third ingredient, water or other liquid, is usually but not always added at the time of manufacture. When the material is delivered to the job site in dry form it consists of the first two ingredients which have been mechanically mixed without the addition of any liquid. Delivery of the plastic refractory in dry form is not very common because of the difficulties encountered in adding water and mixing properly without the equipment that is available at the manufacturer's plant. It is necessary in addition to mixing the three ingredients to employ a kneading and mulling action, the need for which will be explained later. Therefore, the customary procedure is to deliver the plastic refractory to the job site with the proper amount of liquid already added, the grog, plastic material and liquid having been mixed, kneaded and mulled together until a uniform consistency and suitable plasticity are obtained. When delivered to the job site in the latter state the material is used just as it comes from the container. The plastic refractory is tamped or rammed into place piece by piece. When the structure is completed it is cured or matured by the application of heat, which heat is usually developed by firing the furnace that has just been lined or built. It is necessary to apply heat in order to develop permanent hardness and strength in the plastic refractory. Since the material is usually installed without the use of forms, and since it can never be matured with the forms remaining in place the plastic refractory must not only be capable of being molded into place but must also have sufficient resistance to deformation to carry the weight of the plastic refractory structure while in the green or uncured state. It is the difficulty of attaining this balance between plasticity or moldability and resistance to deformation that almost always makes it impractical to mix the material with liquid at the job site, therefore practically all plastic refractory construction of any size is performed with the material in which the liquid has been incorporated at the time of manufacture.

There are, however, serious disadvantages in the use of plastic refractory in which the liquid has been added at the time of manufacture. First, there is a tendency for it to dry out between the time it is manufactured and the time it is used. This prevents storage of the plastic refractory for long periods of time, especially in excessively hot dry atmospheres. It also makes necessary the use of containers which are as nearly moisture tight as practicable and which are expensive. Second, if subjected to low temperatures it is likely to freeze, which at least temporarily renders it unfit for use and frequently necessitates the return of it to the manufacturer for reconditioning. A third drawback in the use of plastic refractory regardless of whether it is shipped in the dry or wet state is shrinkage. The plastic material ingredient, not having been fired previously, is responsible for two kinds of shrinkage which occur during curing. First, there is drying shrinkage which occurs as the liquid leaves the plastic material. Second there is fired shrinkage which occurs as the plastic fire clay changes from the unfired to the fired state. Care must be taken to keep to a minimum both types of shrinkage otherwise shrinkage cracks or a too great change in the volume of the plastic refractory will cause failure. Since both the drying and fired shrinkage are due to the plastic material constituent, control of the shrinkage is best effected by limiting the percentage of plastic material used in the mix.

It is not practicable to ship to the job site plastic refractory which consists of a mechanical mixture of dry plastic material and a dry grog and add the liquid at the job site, because, in addition to mixing the three principal ingredients a kneading and mulling action is needed which will coat each grain of the grog with a layer of wet plastic material in order to develop the necessary uniform consistency and suitable plasticity.

It is the purpose of the present invention to overcome the three drawbacks of plastic refractory pointed out above by preparing in a novel manner a novel refractory composition that is a product intermediate to a loose mixture of the dry ingredients and the ready-to-use plastic refractory which we refer to herein as a novel refractory composition, that is, a dry or partially dry mixture that may be converted into a ready-to-use plastic refractory of uniform consistency and suitable plasticity simply by the addition of water and a minimum of mixing and without the need for any kneading or mulling action. Our invention contemplates also a novel refractory composition which, after being converted to plastic refractory, as described in the previous sentence, produces a plastic refractory wherein the shrinkage of the plastic refractory upon drying and firing is substantially reduced.

Our invention contemplates also a novel refractory composition as described above, which will permit the construction of furnace linings in the manner where the refractory composition is blown into place by a cement gun of a type where water and dry material are brought together in the gun and instantly discharged, instead of by the usual tamping or ramming procedure.

By our novel method of manufacture we are able to coat substantially every particle of grog with a relatively thin coating of plastic material which has been made sticky by the addition of the optimum amount of water. The coating of clay on the particles of grog is due to a mulling or rubbing action in the mixing machine. These clay covered particles of grog tend to agglomerate with others because of the stickiness of the clay. The mulling action tends to bring the larger particles of grog into close juxtaposition separated only by the thin layer of plastic material, and tends to force the smaller particles of plastic material coated grog into the resulting spaces. That arrangement of particles is recognized as being an ideal one as the result will be a refractory body that will tend to have low shrinkage and high density. These agglomerates as they are discharged from the mixing machine are still slightly moist. They can be placed in storage bins or packed in suitable containers and in either case allowed to airdry or the material can be artificially dried. In either case, after the agglomerates are dried they are friable and can be broken down into smaller pieces. However the coating of the individual grains of grog resists further disintegration or separation of the plastic material from the grog particles. Consequently the uniformity of the mix is not destroyed during storage and handling of the air dried mixture. This has been demonstrated by shipping tests and by laboratory tests in which the mixture was subjected to thorough vibration over long periods with no discernible separation of plastic material from the grog particles.

What we have referred to in the preceding paragraph as the "optimum amount of liquid" is approximately that quantity which will produce the maximum of stickiness in the clay. In the customary manner of manufacturing plastic refractory two to three times that percentage of liquid must be used in order to produce plastic refractory of suitable working properties. As a result the plastic material is not very sticky, consequently it is not possible to do as thorough a job of mixing and coating the grains of grog with the plastic material, or conversely, larger percentages of plastic material must be used in the batch to attain in the ready-to-use plastic refractory a plasticity and moldability comparable to that in our improved material. In either case the result is a product inferior to ours in drying and fired shrinkage. There is a further advantage in the mix with the lower percentage of plastic material and the higher percentage of grog because the grog is considerably more resistant than the plastic material to all factors which tend to shorten the life of the refractory in service.

As a specific example of our novel composition and method of making it we take a refractory grog which, for example, may be composed principally of calcined flint clay with some crushed firebrick. These materials are given as illustrations only since other known refractory materials may be used as grog. The composition of the grog may be varied greatly without affecting our invention. The grog material is crushed to the desired particle size. The preferred large particle sizes of the calcined flint clay used are such that they will all go through a three mesh screen and are retained on a ten mesh screen. The balance of the grog contains fine particles that will pass a twenty mesh screen so that the intermediate size particles are kept to a minimum. The recognized desired combination of particle sizes of grog is such that the large particles will bear against each other and the fine ones are sufficiently smaller to fill the voids without actually wedging the large particles apart. A high density is desired, so the proportion of fines is such as to fill the spaces between the larger particles as nearly as possible under practical working conditions. To about 80% by weight of grog we add 20% dry plastic fire clay and then an additional approximately 4% of water, all percentages being by weight. A small amount of organic or inorganic binder, or a combination of both, may be substituted for a portion of the plastic fire clay, if desired, but the percentage of this material should not be higher than 15% by weight on a dry basis. A surface active chemical may also be used if desired, such, for example, as an aliphatic alcohol sulphate. The quantities of this material however should not exceed one-half of 1% and desirably we limit the amount of surface active chemical to less than 1/100%.

The materials are placed in a mixing machine which mixes and kneads them together by repeatedly passing them under a mulling roller and stirring them so that the clay is rubbed against the grog particles and the water is uniformly spread throughout the mixture until the particles of grog are covered with an adherent moist coating of plastic fire clay. With this extremely small amount of water the maximum adherence of clay to the grog is obtained. Each particle of the grog is found to be covered with the clay.

The mulling action in the mixing machine also tends to produce the densest arrangement of coarse and fine grog particles, which means that the coarse particles bear against each other and the fine particles fill the resulting voids. This high density arrangement of grog particles is in itself advantageous in that it produces a fired refractory of higher density. But in addition the skeletal frame of coarse particles bearing against each other makes for a structure that will not shrink as much during drying and subsequent firing as would a structure in which the coarse particles were separated from each other by fine particles of grog or relatively thick masses of fire clay as such an arrangement would permit shifting of the coarse particles when subjected to strains from the fire clay as it shrinks during drying and firing. As a result the mass as a whole would shrink more. Such an arrangement of coarse particles bearing against each other with the fine particles filling the resulting voids cannot be obtained by mixing the ingredients dry because of subsequent segregation nor could it be produced when mixing a dry plastic refractory with liquid on the job site by hand because of the impracticability of applying a mulling action there. When the mixing, kneading and mulling has been completed the material is discharged from the machine and allowed to air dry or artificially dried. It is then ready for use as our novel refractory composition. The material can be dried, handled and shipped, without separation of the coating of clay from the grog particles to any substantial extent. Freezing of the material does not appear to injure the aggregate, or effect separation of the particles to any substantial extent.

In order to form plastic refractory from the refractory composition the refractory composition is spread out and wet down with water. We find that an additional amount of water to bring the total water content to about 8% is adequate. The material is then turned over once or twice and is then ready-to-use plastic refractory. The water is so rapidly and uniformly absorbed by the refractory composition that the plasticity of normal plastic refractory is quickly achieved so that it can be used immediately in the usual manner of refractory construction with plastic refractory, that is, by ramming or tamping it into place piece by piece. The refractory composition takes up the water necessary to convert it to plastic refractory so readily and quickly that the refractory composition may be blown into place by a cement gun of the type where the water and dry materials are brought together in a gun and instantly discharged.

In the construction of furnace linings with plastic refractory we find that substantially better results are obtained when the production of our novel refractory composition is included as intermediate steps in the production of the plastic refractory. One major benefit is a substantial reduction in both drying and fired shrinkage. Another is the increased density (and consequently increased refractoriness) of the finished structure. Both these benefits are attributable to the coating of the grog particles with an adhering layer of clay so that the plastic material is uniformly distributed in thin layers, and to the better prearrangement of the coarse and fine grog particles by our improved method.

While the specific percentages of the plastic refractory materials are given as 80% grog and 20% plastic fire clay, these may be varied through a range of 65% to 90% grog and 10% to 35% plastic fire clay, and up to 15% of the plastic fire clay content may be displaced by a binder.

From the foregoing description it is believed that the nature and advantages of the present invention will be readily apparent to those skilled in this art.

This application is a continuation in part of our prior application, Serial No. 524,130, filed February 26, 1944, and now abandoned.

Having thus described our invention, what we claim as new and desire to secure by Letters Patent is:

1. A method of making a refractory composition that is intermediate to a loose mixture of the dry ingredients and a ready to use plastic refractory, that is capable of being handled and shipped without segregation of the heavy coarse particles from the fine light particles to any substantial extent, which comprises subjecting a mixture of substantially 65% to 90% refractory grog particles and 35% to 10% plastic fire clay, by weight, to a mulling and kneading action with a quantity of water, approximately 4% by weight, sufficient to give the plastic fire clay optimum stickiness and substantially less than that necessary to produce a plastic refractory of a consistency suitable for monolithic refractory construction, until the grog particles are individually coated with the clay and the coated particles are in agglomerates that, upon drying, are easily friable, and drying the agglomerates.

2. A method of making a refractory composition that is intermediate to a loose mixture of the dry ingredients and a ready to use plastic refractory, that is capable of being handled and shipped without segregation of the heavy coarse particles from the fine light particles to any substantial extent, which comprises subjecting a mixture of about 80% refractory grog particles and 20% plastic fire clay, by weight, to a mulling and kneading action with a quantity of water, approximately 4% by weight, sufficient to give the plastic fire clay optimum stickiness and substantially less than that necessary to produce a plastic refractory of a consistency suitable for monolithic refractory construction, until the grog particles are individually coated with the clay and the coated particles are in agglomerates that, upon drying, are easily friable, and drying the agglomerates.

3. A refractory composition comprising an easily friable agglomerate of grog particles individually coated with plastic fire clay according to the method of claim 1.

THEODORE KAUFFMAN, Jr.
LOUIS J. JACOBS.

REFERENCES CITED

The following references are of record in the file of this patent:

UNITED STATES PATENTS

| Number | Name | Date |
|---|---|---|
| Re. 7,958 | Witherell | Nov. 20, 1877 |
| 2,290,914 | Machlin | July 28, 1942 |

FOREIGN PATENTS

| Number | Country | Date |
|---|---|---|
| 215,207 | Great Britain | 1924 |